June 2, 1959   S. G. HENDRIX ET AL   2,888,992
PROPELLER MECHANICAL LOW PITCH STOP
Filed April 12, 1956   4 Sheets-Sheet 1

INVENTORS
SYLVAN G. HENDRIX
RICHARD A. HIRSCH
BY EDWARD H. McDONALD

Craig V. Morton
ATTORNEY

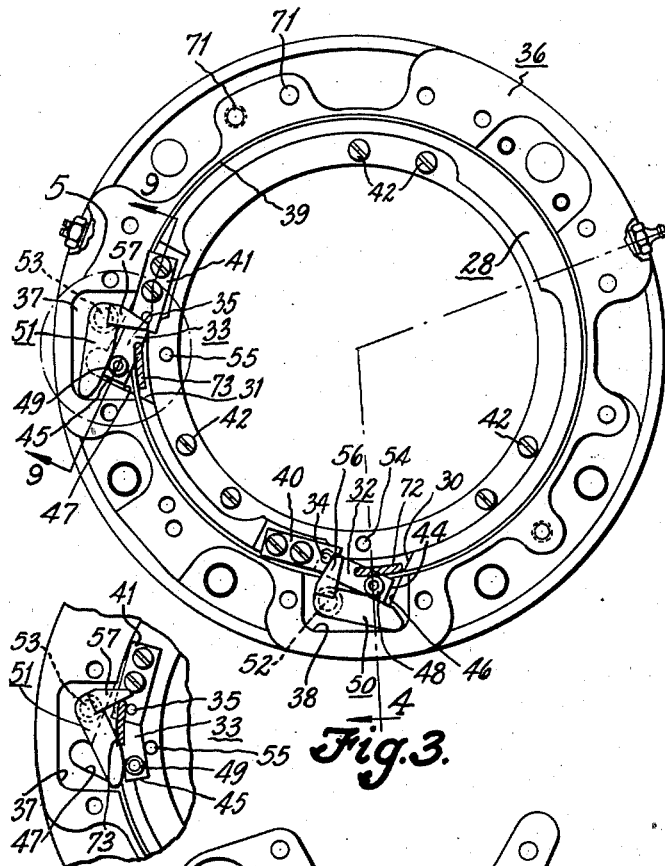
Fig.3.
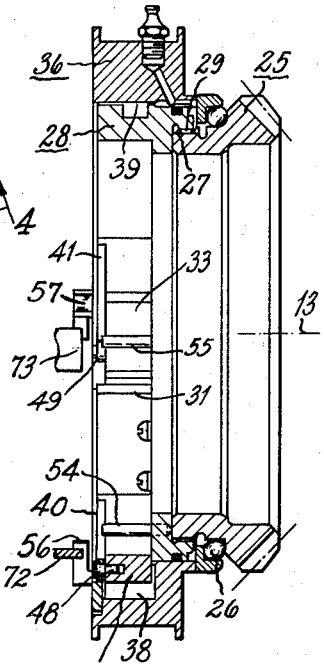
Fig.4.
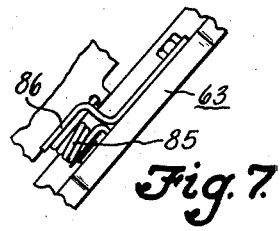
Fig.7.
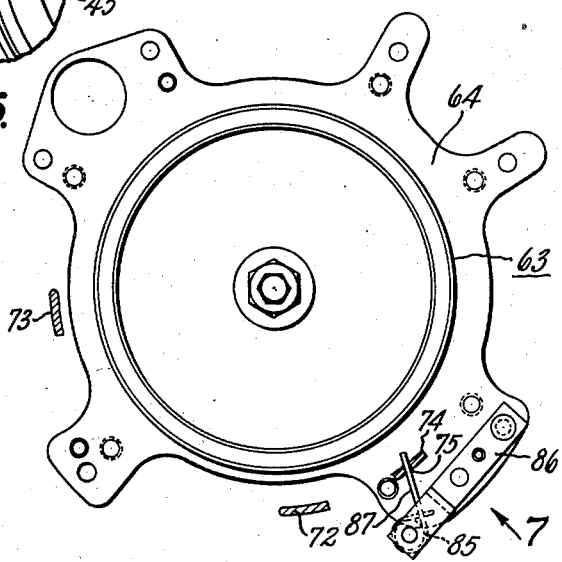
Fig.5.
Fig.6.
INVENTORS
SYLVAN G. HENDRIX
RICHARD A. HIRSCH
EDWARD H. McDONALD
BY Craig V. Morton
ATTORNEY INVENTORS
SYLVAN G. HENDRIX
RICHARD A. HIRSCH
BY EDWARD H. McDONALD
Craig V. Morton
ATTORNEY

United States Patent Office 2,888,992
Patented June 2, 1959

2,888,992

PROPELLER MECHANICAL LOW PITCH STOP

Sylvan G. Hendrix, Troy, Richard A. Hirsch, West Milton, and Edward H. McDonald, Tipp City, Ohio, assignors to General Motors Corporation, Detroit, Mich., a corporation of Delaware Application April 12, 1956, Serial No. 577,715

14 Claims. (Cl. 170—160.31)

This invention pertains to variable pitch propellers, and particularly to a mechanical low pitch stop assembly for variable pitch propellers.

Since it is recognized that in some propellers, the propeller blades are subjected to aerodynamic and centrifugal twisting moments during propeller rotation, which forces tend to rotate the propeller blades in the decrease pitch direction, it is necessary to include stop means which prevent the blades from moving to a pitch position wherein negative thrust is developed when the aircraft is in flight. The present invention relates to a releasable mechanical low pitch stop assembly, which positively prevents movement of the blades below a predetermined low angle during constant speed propeller operation in the governing range, while permitting propeller operation in the negative thrust range when the aircraft is on the ground. Accordingly, among our objects are the provision of a mechanical low pitch stop assembly for a variable pitch propeller; the further provision of a mechanical pitch stop assembly including centrifugally actuated means for engaging the stop during propeller rotation; and the still further provision of a mechanical low pitch stop of the aforesaid type including electromagnetic means for releasing the stop during propeller rotation.

The aforementioned and other objects are accomplished in the present invention by incorporating a first annular member in the propeller hub, which is connected to rotate about the horizontal propeller axis during pitch adjustment of the blades and which carries pivotally mounted stop members that are engageable with a second annular member attached to the propeller hub and restrained against rotation relative thereto. Specifically, the propeller may be of the type disclosed in the Blanchard et al., Patent Nos. 2,307,101 and 2,307,102 wherein each propeller blade is actuated by an independent servo-motor operable to rotate its respective blade about its longitudinal axis. The servo-motors are controlled by a fluid pressure system including pressure developing means and a control valve, the fluid pressure system being disposed within a regulator attached to and rotatable with the propeller hub. Each propeller blade is operatively connected to a bevel type blade gear and the several blade gears mesh with a master gear supported in the hub for rotation about the horizontal propeller axis. The master gear coordinates the pitch adjusting movements of all propeller blades, and, accordingly, has a predetermined angular position relative to the hub for every pitch position of the propeller blades.

The master gear is connected by straight splines to a first annular member whereby the first annular member is rotated about the horizontal propeller axis during pitch changing movements of the propeller blades. The rotatable annular member carries a pair of centrifugally responsive stop members, the stop members being eccentrically pivoted on the rotatable annular member and angularly spaced thereon. A second annular member coaxial with the horizontal propeller axis is fixedly attached to the hub and circumscribes the rotatable annular member. The second, or fixed annular member, is formed with a pair of angularly spaced notches, the ends of which may be engaged by the eccentrically pivoted stop members at the selected low pitch stop position of the propeller blades to positively prevent further movement of the propeller blades in the decrease pitch direction during propeller rotation. During propeller rotation, the stop members are urged outwardly in a radial direction about their pivots by centrifugal force, and, thus, will automatically be positioned to engage their respective notches in the fixed annular member at the selected low pitch stop position of the propeller blades.

As disclosed herein, the mechanical pitch stop assembly is incorporated in a propeller of the type disclosed in copending application Serial No. 273,806, filed February 28, 1952, now U.S. Patent No. 2,745,500, in the name of Richard E. Moore et al., and assigned to the assignee of this invention. Thus, the propeller includes a hub carried accumulator for supplying pressure fluid to feather and unfeather the propeller blades. The pitch stop releasing mechanism is supported on the accumulator housing and includes a rotatable ring having a pair of diametrically spaced solenoid poles thereon. The ring is rotatably supported on a barrel which is attached to the accumulator housing. A fixed solenoid support is also attached to the accumulator housing, the fixed solenoid support carrying a pair of diametrically paced solenoid coils and solenoid poles. Upon energization of the solenoid coils, the ring is rotated throughout a small angular distance relative to the accumulator housing.

In order to remove the eccentrically pivoted stop members from the notches in the fixed annular member, the rotatable ring is formed with a pair of axially extending lugs. The axially extending lugs are engageable with a pair of release levers pivotally mounted on the fixed annular member. When the solenoid coils are energized, the rotatable ring imparts movement to the release levers through the lugs, thereby preventing outward radial movement of the eccentrically pivoted stop members into the notches of the fixed annular member, or if the eccentrically pivoted stop members are located in the notches of the fixed annular member but not engaged with the end surfaces of the notches, the release levers move the stop members out of the notches. When the solenoid coils are deenergized, the rotatable ring is repositioned by resilient means so that the lugs are out of engagement with the release levers, thereby permitting the eccentrically pivoted stop members to move radially outward into the notches during propeller rotation at the low pitch stop angle. Energization of the solenoid coils to release the low pitch stop is controlled by movement of the pilot's propeller control lever. When the propeller control lever is in the governing, or feathering ranges, the solenoid coils are deenergized, but when the propeller control lever is moved into the negative thrust range, the solenoid coils are energized. When the low pitch stop members are retracted, the propeller blades can be moved in the decrease pitch direction below the normal low pitch stop position.

Further objects and advantages of the present invention will be apparent from the following description, reference being had to the accompanying drawings wherein a preferred embodiment of the present invention are clearly shown.

In the drawings:

Fig. 3 is a view, partly in section and partly in elevation, with certain parts removed, taken generally along line 3—3 of Fig. 1.

Fig. 4 is a view, partly in section and partly in elevation, taken along line 4—4 of Fig. 3.

Fig. 5 is a fragmentary view, taken within the circle 5 of Fig. 3 indicating the position of the eccentrically pivoted stop members when released.

Fig. 6 is a view, partly in elevation and partly in section, with certain parts removed, taken generally along line 6—6 of Fig. 1.

Fig. 7 is a fragmentary view, in elevation, taken in the direction of arrow 7 of Fig. 6.

Figure 1:
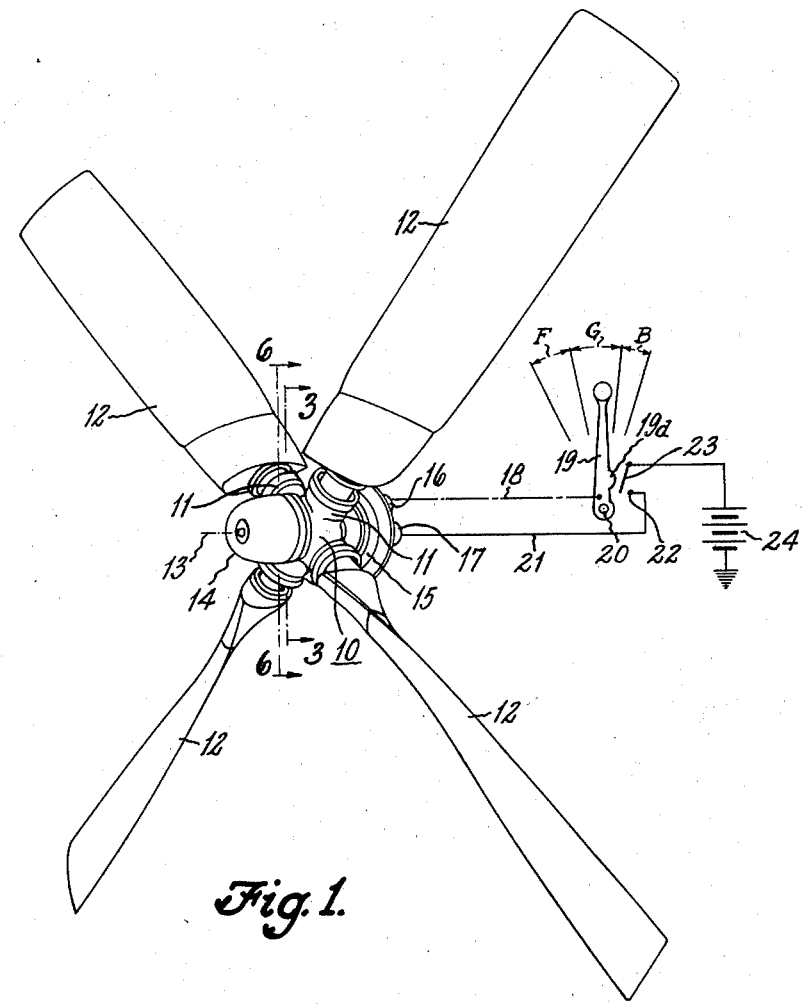
Fig. 1 is a perspective view of a variable pitch propeller including the mechanical low pitch stop assembly of this invention, this figure also indicating schematically the pilot's control lever and switch for releasing the low pitch stop.

With particular reference to Fig. 1, a propeller is shown comprising a hub 10 having a plurality of radially extending sockets 11 within which propeller blades 12 are journaled for rotation about their longitudinal axes. The propeller hub 10 is arranged to be drivingly connected to an engine driven shaft, not shown, the horizontal propeller axis being depicted by the numeral 13 in Fig. 1. A streamlined accumulator cover 14 is attached to the front of the hub 10, and a regulator assembly 15 is attached to the rear of the hub 10.

A servo-motor, or torque unit assembly, not shown, of the type shown in the Martin et al. Patent 2,500,692 is disposed within the hollow shank portion of each propeller blade 12. The torque units include a piston and cylinder combination, the piston being capable of fluid pressure actuation in both directions and operatively connected to its respective blade so that piston reciprocation effects rotation of its blade about the longitudinal blade axis. The application of fluid pressure to the torque units for varying the pitch of the propeller blades 12 is controlled by valve means within the regulator 15 in accordance with the aforementioned Blanchard et al patents.

The regulator assembly 15 includes a stationary adapter assembly which supports an angularly movable propeller control ring having an outwardly extending lug 16. In addition, the stationary adapter assembly supports a brush block 17, the brushes of which engage a slip ring assembly, not shown, mounted on the rotatable regulator 15. The lug 16 of the control ring is shown as being connected schematically by linkage 18 to a pilot's propeller control lever 19 movable about a fixed pivot 20. The brush block 17 is shown connected by a wire 21 to a switch terminal 22. The switch terminal 22 is arranged to be engaged by a switch blade 23, which is connected to a source of electric power, such as battery 24. The pilot's control lever 19 is shown including a cam 19a, which engages the switch blade 23 and moves the switch blade 23 into engagement with the contact 22 when the control lever 19 is moved into the negative thrust, or beta range, indicated by the angular distance B in Fig. 1. When the propeller control lever 19 is in the governing range, wherein the propeller is operated at a substantially constant speed and denoted by the letter G, or the feathering range denoted by the letter F, the switch blade 23 does not engage the contact 22.

The mechanical low pitch stop assembly of this invention operates in a manner similar to that disclosed in copending application, Serial No. 545,034, filed November 4, 1955, in the name of Oren F. Flaugh et al. Accordingly, each propeller blade 12 is connected to a blade gear, not shown, which meshes with the bevel type master gear 25 depicted in Fig. 4, the master gear 25 being supported in the hub 10 for rotation about the propeller axis 13. The master gear 25 coordinates and synchronizes the pitch changing movement of all propeller blades 12 in the hub, the master gear 25 being rotatably supported by ball bearing means 26. As seen in Fig. 4, the master gear 25 is formed with an externally straight splined portion 27, by which means the master gear 25 is drivingly connected to an annular member 28 having an internally straight splined portion 29. Since the propeller blades 12 are drivingly connected with the master gear 25, rotation of the propeller blades about their longitudinal axes will effect rotation of the master gear about the horizontal propeller axis. Moreover, if the master gear 25 is restrained against rotation in the decrease pitch direction, the propeller blades 12 will, likewise, be restained against rotation in the decrease pitch direction. Hence, the present invention incorporates mechanical abutment means for preventing rotation of the annular member 28 and the master gear 25 in the decrease pitch direction when the propeller blades 12 are moved to a predetermined low angle during propeller operation in the governing range.

In order to achieve this result, the annular member 28, as shown in Figs. 3 and 4, is formed with a pair of angularly spaced axially extending grooves 30 and 31. Adjacent groove 30 a stop member 32 is eccentrically pivoted by means of a pair of pins 34. Similarly, a stop member 33 is eccentrically pivoted by means of a pair of pins 35 adjacent one end of the groove 31. Inasmuch as the annular member 28 rotates with the propeller hub 10, during propeller rotation, the stop members 32 and 33 will be urged outwardly in a clockwise direction about their pivot pins 34 and 35 due to the thrust of centrifugal force acting thereon, as viewed in Figure 3.

Figure 9:
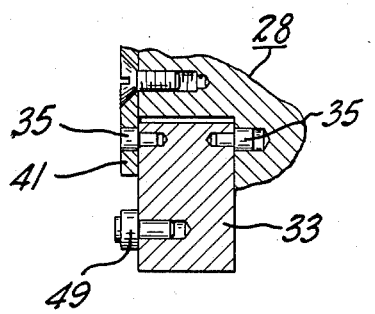
Fig. 9 is a fragmentary sectional view taken along line 9—9 of Figure 3.

The annular member 28 is circumscribed by a second annular member 36, which is attached to the propeller hub 10 by bolts, not shown in Fig. 4, whereby the annular member 36 is restrained against rotation relative to the hub 10. The internal surface 39 of the annular member 36 is formed with a pair of angularly spaced, axially extending notches 37 and 38. The eccentrically pivoted weights 32 and 33 carried by the annular member 28 engage the internal surface 39 of the member 36 when the pitch position of the propeller blades is substantially above the selected low pitch stop position. In other words, the annular member 28 rotates about the horizontal propeller axis 13 relative to the hub 10 during pitch adjustment of the blades, i.e. in a clockwise direction, as viewed in Fig. 3, during pitch increasing movement of the blades and in a counterclockwise direction during pitch decreasing movement of the blades. However, the annular member 36 is fixed relative to the hub 10. One of each pair of pivot pins 34 and 35 of the stop members 32 and 33, respectively, are piloted in plates 40 and 41, respectively, as seen in Figure 9, attached to the member 28 by screws, the other pin of each pair being piloted in the member 28. The member 28 is also secured to the master gear 25 by a plurality of screws 42.

At the selected low pitch stop position of the propeller blades, for instance, positive 12°, the ends 44 and 45 of the stop members 32 and 33, respectively, engage inclined surfaces 46 and 47, respectively, of the notches 38 and 37 so as to positively prevent further rotation of the member 28 in the counterclockwise direction relative to the member 36 and, hence, prevent further movement of the propeller blades in the decrease pitch direction. As seen in Figs. 3 and 4, the stop members 32 and 33 also carry rollers 48 and 49, respectively. The rollers 48 and 49 engage cam surfaces of release levers 50 and 51, which are eccentrically pivoted at 52 and 53, respectively, within the notches 38 and 37 of the annular member 36. The release levers are, likewise, urged in a clockwise direction about their pivots 52 and 53 to the position shown in Fig. 3 during propeller rotation by centrifugal force since their masses are eccentrically located. However, the release levers 50 and 51 can be moved in a counterclockwise direction about their pivots 52 and 53 so as to prevent engagement of the stop members 32 and 33 with the surfaces 46 and 47 of the notches 38 and 37. When the release levers 50 and 51 are moved in a counterclockwise direction to the position shown in Fig. 5, the cam surfaces thereof engage the rollers 48 and 49 of the stop members 32 and 33 to prevent outward pivotal movement of the stop members 32 and 33 by centrifugal force, thereby preventing engagement of the pitch stop and permitting movement of the propeller blades into the negative thrust range of propeller operation. As shown in Figs. 3 and 5, when the release levers 50 and 51 are in this position, the stop members 32 and 33 will engage pins 54 and 55, respectively.

Figure 2:
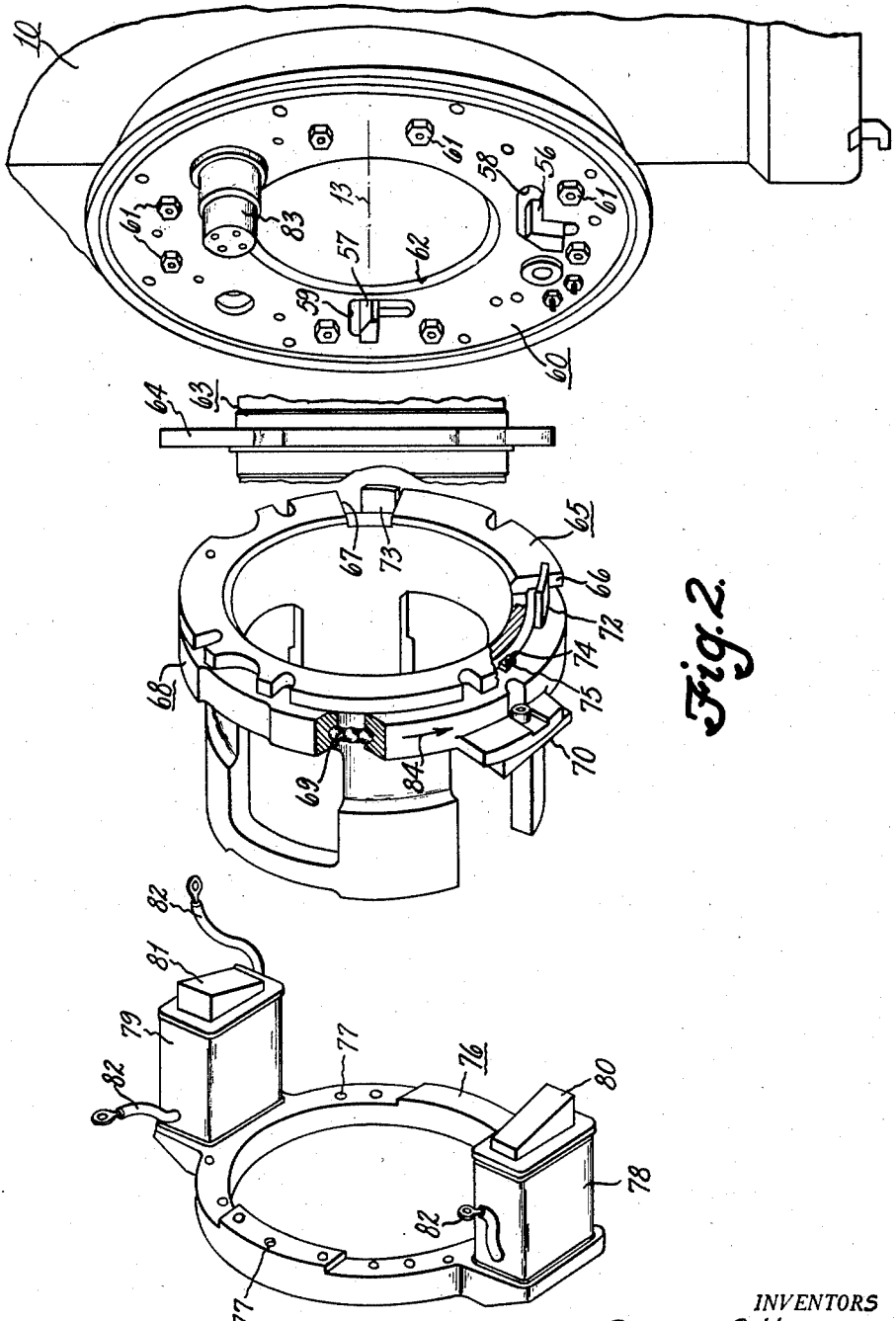
Fig. 2 is an exploded view, partly in elevation and partly in section, illustrating components of the mechanical low pitch stop assembly.
Figure 8:
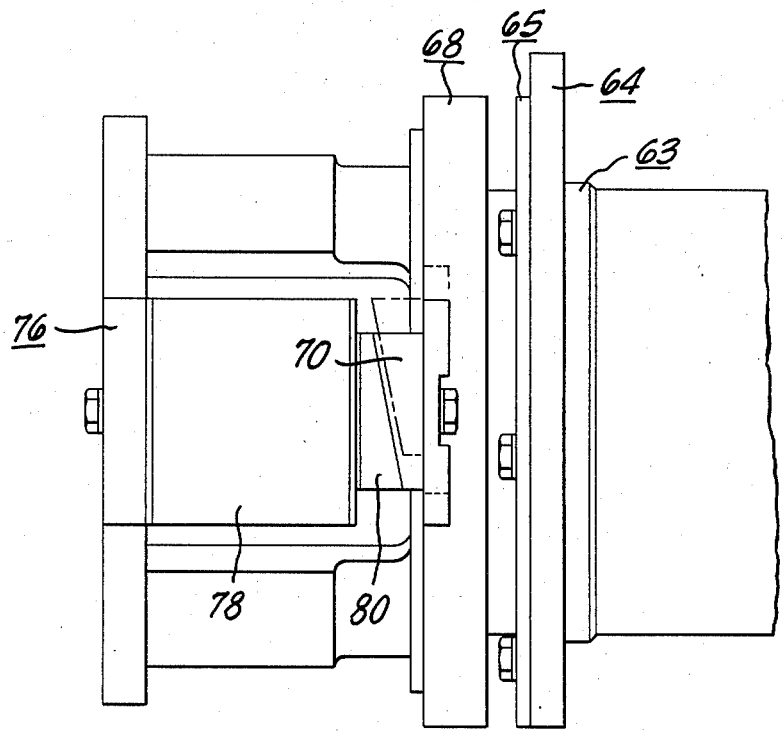
Fig. 8 is a fragmentary plan view of the mechanical low pitch stop assembly.

With particular reference to Figs. 2 and 3, the release levers 50 and 51 are formed with axially extending lugs 56 and 57, respectively, which extend through apertures 58 and 59 of a plate 60, which is attached to the member 36 by bolts 61. The bolts 61 extend through holes 71 of the member 36 and into the hub 10 so as to fixedly attach the plate 60 and the annular member 36 to the hub 10. The plate 60 has a central opening 62, which receives an accumulator housing 63 having a flange 64. The flange 64 is attached to the plate 60 by suitable bolts, not shown. The accumulator housing 63 receives a solenoid barrel assembly 65 having a pair of angularly spaced notches 66 and 67. The barrel assembly 65 is attached to the flange 64 by suitable bolts, not shown, and, consequently, is restrained against rotation relative to the hub 10. A ring 68 is rotatably supported on the barrel 65 by ball bearing means 69. The ring 68 carries a pair of diametrically spaced armatures, only one of which, 70, is shown in Figs. 2 and 8. In addition, the ring 68 is formed with a pair of axially extending lugs 72 and 73, which extend through the slots 66 and 67, respectively, of the barrel assembly 65. The ring 68 is also formed with a lug 74 having a substantially radially extending hole 75 therein. The barrel 65 also receives a stationary solenoid support 76, the support being attached to the barrel 65 by bolts, not shown, which extend through openings 77. The solenoid support 76 carries a pair of diametrically opposed solenoid coils 78 and 79, which encompass fixed solenoid poles 80 and 81, respectively. The terminals 82 of the solenoid coils 78 and 79 are adapted to be electrically connected with the terminals of a cannon type electrical outlet 83 carried by the hub 10 and extending through the plate 60.

When the switch blade 23 is moved into engagement with the contact 22 by the cam 19a, the solenoid coils 78 and 79 are energized. When the coils 78 and 79 are energized, the solenoid ring 68 is rotated in the direction of arrow 84 of Fig. 2 due to magnetic attraction between poles 80 and 81 and the armatures 70, rotative movement of the ring 68 being limited by engagement between the poles 80 and 81 with the armatures carried by the ring 68.

During angular movement of the solenoid ring 68 in the direction of arrow 84 in Fig. 2, the lugs 72 and 73 engage the lugs 56 and 57 of the release levers 50 and 51, respectively, so as to impart counterclockwise movement of the release levers about their pivots 52 and 53, as viewed in Fig. 3. If, at this time, propeller blades 12 are above a positive 12°, at say a positive 40°, the stop members 32 and 33 will not be aligned with the notches 38 and 37. Accordingly, the cam surfaces of the release levers 50 and 51 will move to a position substantially in alignment with the internal surface 39 so as to prevent movement of the stop members 32 and 33 radially outwardly by centrifugal force during movement of the blades in a decrease pitch direction past the low pitch stop angle positive 12°. However, if propeller blades are at the low pitch stop angle of a positive 12° upon energization of the solenoid coils 78 and 79, angular movement of the ring 68 will not remove the stop members 32 and 33 from the notches 38 and 37, since they are in positive engagement with the ends of the notches. Thus, the stop members 32 and 33 can only be retracted when the blades are above positive 12°.

With particular reference to Figs. 6 and 7, the flange 64 of the solenoid housing 63 has attached thereto a spring 85 by means of a bracket 86. One end 87 of the spring 85 extends inwardly through the hole 75 in the lug 74 of the ring 68. Accordingly, when the solenoid coils 78 and 79 are deenergized, the spring 87 imparts movement to the ring 68 in a direction opposite to that of arrow 84 in Fig. 2 so that the lugs 72 and 73 are moved away from the lugs 56 and 57 of the release levers 50 and 51, respectively. Accordingly, when the solenoid coils 78 and 79 are deenergized, the lugs 72 and 73 are positioned, as shown in Fig. 3, thereby permitting outward pivotal movement of the release levers 50 and 51 by centrifugal force during propeller rotation, and, likewise, permitting outward pivotal movement of the stop members 32 and 33 so that the stop members can engage the surfaces 46 and 47 of the fixed annular member 36 at the selected low pitch stop position of the propeller blades.

From the foregoing, it is readily apparent that the present invention provides a unique mechanical low pitch stop assembly for variable pitch propellers wherein the stop members are actuated by centrifugal force during propeller rotation to prevent movement of the propeller blades below a predetermined angle during constant speed propeller operation. Moreover, the low pitch stop members can be moved to an inoperative position, or operation thereof can be prevented, by electromagnetic means controlled by the pilot.

While the embodiment of the present invention as herein disclosed, constitutes a preferred form, it is to be understood that other forms might be adopted.

What is claimed is as follows:

1. A variable pitch propeller including, a hub, a plurality of propeller blades journaled in the hub for rotation about their longitudinal axes to different pitch positions, means supported for rotation in said hub about the horizontal propeller axis and operatively connected to said blades so as to be rotated thereby upon rotation of said blades about their longitudinal axes, a member attached to said hub so as to be restrained against rotation relative thereto, and means actuated solely by centrifugal force carried by said first recited means and engageable with said member at a predetermined pitch position of said propeller blades for preventing further movement of said propeller blades in the decrease pitch direction in one range of propeller operation.

2. A variable pitch propeller including, a hub, a plurality of propeller blades journaled in the hub for rotation about their longitudinal axes to different pitch positions, means supported for rotation in said hub about the horizontal propeller axis and operatively connected to said blades so as to be rotated thereby upon rotation of said blades about their longitudinal axes, a member attached to said hub so as to be restrained against rotation relative thereto, means actuated solely by centrifugal force carried by said first recited means and engageable with said member at a predetermined pitch position of said propeller blades for preventing further movement of said propeller blades in the decrease pitch direction, and electromagnetic means for preventing operation of said centrifugally actuated means.

3. A variable pitch propeller including, a hub, a plurality of propeller blades journaled in the hub for rotation about their longitudinal axes to different pitch position, means supported for rotation in said hub about the horizontal propeller axis and operatively connected to said blades so as to be rotated, thereby upon rotation of said blades about their longitudinal axes, a member attached to said hub so as to be restrained against rotation relative thereto, a plurality of stop elements actuated solely by centrifugal force carried by said first recited means and engageable with said member at a predetermined pitch position of said propeller blades for preventing further movement of said blades in a decrease pitch direction, and electromagnetic means for preventing centrifugal actuation of said stop elements.

4. A variable pitch propeller including, a hub, a plurality of propeller blades journaled in said hub for rotation about their longitudinal axes to different pitch positions, a first member supported for rotation in said hub about the horizontal propeller axis and operatively connected to said blades so as to be rotated thereby upon pitch changing movement of said blades, and means actuated solely by centrifugal force carried by said first member and operatively engageable with a part fixed relative to said hub at a predetermined pitch position of said propeller blades for preventing further movement of said propeller blades in a decrease pitch direction.

5. A variable pitch propeller including, a hub, a plurality of propeller blades journaled in said hub for rotation about their longitudinal axes to different pitch positions, a first member supported for rotation in said hub about the horizontal propeller axis and operatively connected to said blades so as to be rotated thereby upon pitch changing movement of said blades, means actuated solely by centrifugal force carried by said member and operatively engageable with a part fixed relative to said hub at a predetermined pitch position of said blades for preventing further movement of said blades in a decrease pitch direction, and means for preventing centrifugal actuation of said last recited means to permit movement of said blades in the decrease pitch direction below said predetermined pitch position.

6. In a variable pitch propeller including, a hub, a plurality of propeller blades journaled in said hub for rotation about their longitudinal axes to different pitch positions, a master gear supported for rotation in said hub about the horizontal propeller axis and operatively connected to said blades so as to be rotated thereby upon pitch changing movement of said blades, a first annular member connected to said master gear for rotation therewith, a second annular member attached to said hub so as to be restrained against rotation relative thereto, and means actuated solely by centrifugal force carried by said first annular member and engageable with the second annular member at a predetermined pitch position of said propeller blades for preventing further movement of said propeller blades in a decrease pitch direction.

7. In a variable pitch propeller including, a hub, a plurality of propeller blades journaled in said hub for rotation about their longitudinal axes to different pitch positions, a master gear supported for rotation in said hub about the horizontal propeller axis and operatively connected to said blades so as to be rotated thereby upon pitch changing movement of said blades, a first annular member connected to said master gear for rotation therewith, a second annular member attached to said hub so as to be restrained against rotation relative thereto, means actuated solely by centrifugal force carried by said first annular member and engageable with the second annular member at a predetermined pitch position of said propeller blades for preventing further movement of said propeller blades in a decrease pitch direction, and means for preventing actuation of said last recited means to permit further movement of said propeller blades in the decrease pitch direction below said predetermined pitch position.

8. In a variable pitch propeller including, a hub, a plurality of propeller blades journaled in said hub for rotation about their longitudinal axes to different pitch positions, a master gear supported for rotation in said hub about the horizontal propeller axis and operatively connected to said blades so as to be rotated thereby upon pitch changing movement of said blades, a first annular member connected to said master gear for rotation therewith, a second annular member attached to said hub so as to be restrained against rotation relative thereto, and a plurality of eccentrically pivoted stop elements carried by said first annular member, said second annular member circumscribing said first annular member and having a plurality of notches therein, said stop elements being responsive to centrifugal force during propeller rotation and engageable with the notches of said second annular member at a predetermined pitch position of said propeller blades for preventing further movement of said propeller blades in a decrease pitch direction.

9. In a variable pitch propeller including, a hub, a plurality of propeller blades journaled in said hub for rotation about their longitudinal axes to different pitch positions, a master gear supported for rotation in said hub about the horizontal propeller axis and operatively connected to said blades so as to be rotated thereby upon pitch changing movement of said blades, a first annular member connected to said master gear for rotation therewith, a second annular member attached to said hub so as to be restrained against rotation relative thereto, a pair of angularly spaced, eccentrically pivoted stop elements carried by said first annular member, the second annular member circumscribing the first annular member and having a pair of angularly spaced notches therein, said stop elements being responsive to centrifugal force during propeller operation so as to engage said notches at a predetermined pitch position of said propeller blades to prevent further movement of said propeller blades in a decrease pitch direction, and means carried by said second annular member and engageable with said stop elements for preventing engagement between the stop elements and the notches to permit further movement of said propeller blades in the decrease pitch direction below said predetermined pitch position.

10. The combination set forth in claim 9 wherein said last recited means comprises a pair of eccentrically pivoted release levers carried by the second annular member and disposed within said notches.

11. The combination set forth in claim 10 wherein said stop assembly includes means engageable with said release levers for moving them about their pivots to prevent entrance of said stop elements into said notches.

12. In a variable pitch propeller including, a hub, a plurality of propeller blades journaled in said hub for rotation about their longitudinal axes to different pitch positions, a master gear supported for rotation in said hub about the horizontal propeller axis and operatively connected to said blades so as to be rotated thereby upon pitch changing movement of said blades, a first annular member connected to said master gear for rotation therewith, a second annular member attached to said hub so as to be restrained against rotation relative thereto, a plurality of centrifugally responsive stop elements pivotally carried by said first annular member and engageable with the second annular member at a predetermined position of said propeller blades for preventing further movement of said propeller blades in a decrease pitch direction, and manually controllable electromagnetic means for preventing centrifugal actuation of said stop elements to permit further movement of said propeller blades in the decrease pitch direction below said predetermined pitch position.

13. The combination set forth in claim 12 wherein said electromagnetic means includes a rotatable ring having a plurality of armatures thereon, a solenoid support having a plurality of solenoid coils and poles thereon, and means actuated in response to rotation of said ring due to energization of said solenoid coils for preventing centrifugal actuation of said stop elements.

14. The combination set forth in claim 13 wherein said last recited means comprises a pair of release levers pivotally mounted on said second annular member and engageable with said stop elements for preventing centrifugal actuation thereof.

References Cited in the file of this patent

UNITED STATES PATENTS

| | | |
|---|---|---|
| 2,149,388 | Caldwell | Mar. 7, 1939 |
| 2,477,868 | Forman | Aug. 2, 1949 |
| 2,487,239 | Hardy | Nov. 8, 1949 |